Figures 1, 2, 3:
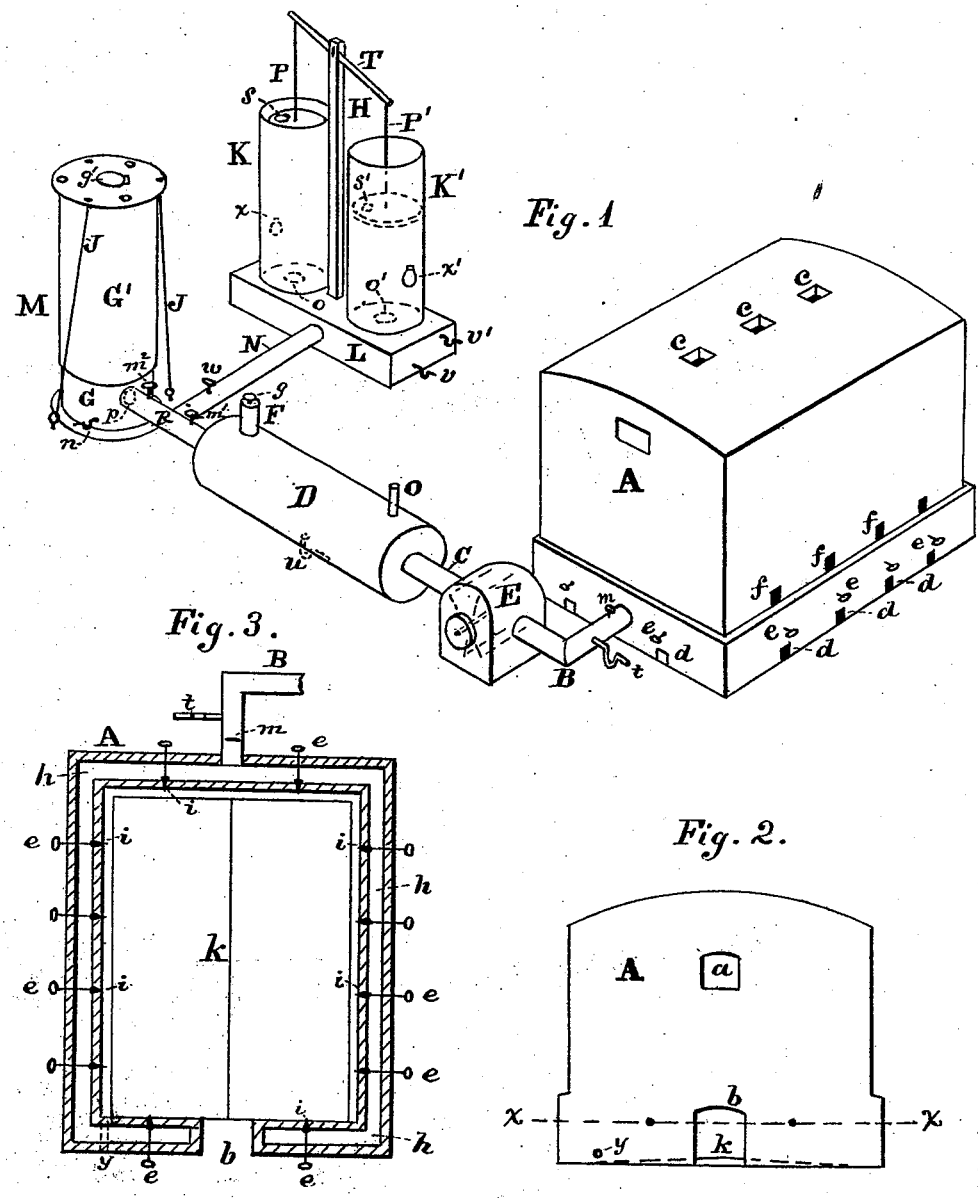

H. M. PIERCE.
APPARATUS AND PROCESS FOR TREATING WOOD FOR CHARCOAL AND OTHER PRODUCTS.

No. 184,898. Patented Nov. 28, 1876.

Witnesses:
Theo. Munger
S. M. Pool

Inventor:
Henry M. Pierce
by H. A. Daniels
Attorney

UNITED STATES PATENT OFFICE.

HENRY M. PIERCE, OF DETROIT, MICHIGAN.

IMPROVEMENT IN APPARATUS AND PROCESSES FOR TREATING WOOD FOR CHARCOAL AND OTHER PRODUCTS.

Specification forming part of Letters Patent No. 184,898, dated November 28, 1876; application filed October 26, 1876.

*To all whom it may concern:*

Be it known that I, HENRY MILLER PIERCE, of Detroit, in the county of Wayne and State of Michigan, have invented certain new and useful Improvements in Apparatus and Process for Treating Wood for Charcoal and other Products; and I do hereby declare that the following is a full, clear, and exact description thereof, which will enable others skilled in the art to which it appertains to make and use the same, reference being had to the accompanying drawing, and to the letters of reference marked thereon, which form a part of this specification.

Similar letters indicate similar parts of the invention on said drawing.

My invention relates to that class of kilns that is used in the manufacture of wood-charcoal; and consists in certain details of furnace construction, and in a process and apparatus for condensing and collecting the pyroligneous acid evolved during carbonization, the nature of all of which will more fully appear on referring to the specification and accompanying drawing.

In the accompanying drawing, which illustrates my invention and forms a part of this specification, Figure 1 is a perspective view of a charcoal-kiln, with my apparatus attached. Fig. 2 is a front view of the kiln. Fig. 3 is a horizontal section of the charcoal-kiln, taken on the line $x\,x$ of Fig. 2.

In the drawing referred to, A designates a charcoal-kiln, with doors $a$ and $b$ for charging the kiln with wood. $c$ indicates openings in the roof, through which the kiln is fired; $d$, the draft-holes at the bottom of the walls of the kiln, each being about two and one-half by four and one-half inches in size, about three feet apart, and extending entirely around the kiln.

In the body of the wall of the kiln, and immediately above the draft-holes $d$, a flue, $h$, is constructed, preferably measuring about six by eighteen inches in width and depth, the said flue being intercepted by the door $b$. The dampers $e$ are used to check the flow of gases into the flue $h$.

If this apparatus is to be attached to a kiln already built, a wall about three feet high should be put up outside and adjoining the kiln, and provided with the flue $h$, draft holes $d$, and dampers $e$.

The holes $i$, opening from the kiln into the flue $h$, are for the passage of gases into said flue, the same being regulated by means of the dampers $e$. The test-holes $f$, in the walls of the kiln, are about three feet apart, and about the same distance above the draft-holes $d$. The floor $k$ of the kiln is laid in any suitable cement, and is inclined to a given point where a faucet or trap, $y$, is placed for the purpose of drawing off the tarry matter. B is a flue or pipe for conducting the gases from the kiln A, said flue being also a partial condenser, and provided with a damper, $m$, for regulating or shutting off the passage of gases. A trap, $t$, serves to let off the liquor from gases condensed in the pipe B. E is a pressure-fan properly incased, and connecting with the pipe B and another pipe C, the latter leading to the receptacle D.

The purpose of this fan is to withdraw the gases from the kiln and project them into the said receptacle D. The latter may have one or more compartments, or it may be filled with flues. I prefer that it should be a tubular boiler slightly inclined so as to carry off the condensed liquor.

O is an opening into receptacle, D, through which gas, air, or steam may be forced into the body of the vapors for increasing the pressure on them in said receptacle.

F is a pipe with a stop-cock or adjustable valve, $g$, for regulating the escape of vapor or gases. It may be regulated by a governor, left to act by its own weight, or may be left open, as required. A trap, $u$, is provided for letting off liquors condensed in the receptacle D.

R is a pipe connecting the receptacle D with a receiving-condenser, M, another pipe, N, branching from the pipe R, leading to a gas-reservoir, L. The passage of gases from receptacle D to M and L is regulated or shut off entirely by means of stop-cock $m^1$, and a damper or stop-cock, $m^2$, is provided to regulate or shut off gases passing to M only when desired.

M is a receptacle for receiving and condensing, by pressure, the gases delivered from D. It consists of two cylinders, one of which, G, is closed at the bottom, and is secured to a proper foundation; the other, G', is closed at the upper end, and may be fitted either outside or inside the cylinder G, so as to operate as a cap to the latter, and move up and down according to the pressure of the gases. A valve, p, opens from pipe R to the said receiver M; an adjustable valve, g', is provided for regulating the escape of gases, air, steam, or vapor, and n is a trap for drawing off liquors condensed in receiver M.

The cylinder G', forming a cap to G, is suitably weighted, and is held down by rubber or other elastic cords J, to regulate the pressure on the gases, as desired.

When the receptacles D and M are used in conjunction, I place the fan E between them, in which case D may be used as a cooler.

A double-cylinder compressor is indicated by H, and consists of a gas-reservoir, L, and cylinders K and K', two valves, o and o', opening from L to K and K', respectively, and pipe N, connecting reservoir L with pipe R. Two pistons, P P', are connected to the walking-beam T, so as to operate severally in the cylinders K K', said pistons being provided with valves s s', the same opening outward. The openings in the cylinders K K', provided with the adjustable valves x x', are for the passage of gas into conductors or flues, which may be applied thereto for heating purposes. A trap, v, is for carrying off the clearer liquor condensed in reservoir L, and trap v' is for drawing off heavier tarry matter.

The operation of the apparatus is as follows: The kiln A is charged with wood through the doors a and b, which are then closed and sealed. Fire is then communicated to the wood through the apertures c at the top, or d at the bottom, if preferred. The holes c are then sealed; the test-holes f are closed with brick and mortar, the inlet-holes d being left open; the dampers e are left open to admit the gases into the flue h. The pressure-fan E is then set in motion; the gases thrown off by the wood find their way into flue h, and are withdrawn by the fan E, through tube B, and projected into receptacle D. The gases are compressed in D, by pressure-fan E, till the adjustable valve g opens by the pressure, and allows the vapor and uncondensed gases to escape.

It will be noticed that the distinguishing feature of my process lies in the manner of condensing the pyroligneous vapors, which is by compression, instead of by reduction in temperature, as usually practiced. Indeed, it is essential to the proper concentration of the acid and separation of the watery diluent, that the temperature shall not fall below 212°, for it is only at that point, or about it, that I am enabled to thoroughly discharge the aqueous vapors in the manner intended.

In practice, I find a temperature of from 212° to 220°, maintained in the compressing-chamber, productive of beneficial results. The amount of pressure necessary can be readily determined by noticing the color of the escaping aqueous vapors, which have a milky tint when commingled with the valuable pyroligneous matters I desire to separate.

When the vapors show this tint it is only necessary to increase the weight on the escape-valve to deprive them of the accompanying acid.

I do not desire to limit myself to the precise details herein named, for it is evident that more or less beneficial results may be obtained by variations both in temperature and pressure, a reduction of the first, of course, necessitating a corresponding increase in the second, and vice versa. Under the pressure thus brought to bear on the gases in D, the most valuable products contained in the gases are condensed. D becomes sufficiently warm to prevent the vapor of water condensing, and the vapor passes off through valve g.

Thus an exceedingly concentrated pyroligneous acid is obtained in receptacle D, and drawn off through the trap u. The acid thus produced will average from 1.06° to 1.07° Baumé, while the average obtained by cooling the gases is much lower. By this means an acid is obtained sufficiently strong to corrode lead, and to fill in the arts the requirements hitherto found in crude acetic acid. I apply heat to receptacle D, if the gases from the kiln A do not raise its temperature sufficiently high, or otherwise regulate its temperature.

In my process thus far described, a considerable percentage of the valuable pyroligneous products pass off with the vapor of water, and with the uncondensable gases. To economize a still larger percentage of these gases, I make the following arrangement: I place the fan E between the receptacles D and M, and open the stop cocks or dampers $m^1$ and $m^2$. I convert receptacle D into a partial cooler, in which much of the vapor of water is condensed with some valuable pyroligneous products, and the uncondensed gases are forced into the condensing-receiver M through valve p. As the gases accumulate in M, the cap G' is lifted, and thus the double pressure made by the fan E and the cap G' is brought to bear upon the gases. Thus a much larger percentage of the valuable products from wood carbonization is obtained, and a still stronger acid.

By using my double-cylinder compressor H, very nearly all the valuable pyroligneous products thrown off in the charring of wood are condensed. In operating it, damper $m^1$ in pipe R is open and $m^2$ is shut, the damper w in pipe N being open. The gas, being thus conducted to reservoir L, passes from thence alternately into the cylinders K and K', through the valves o and o'. A considerable compression of the gases takes place in reservoir L, while in cylinders K and K' the pressure upon the gases can be adjusted to almost any required extent.

If I desire to use the uncondensable gases for heating or illuminating purposes, I attach tubes to the cylinders K K' to lead from the valves $x x'$, and fasten down the valves $s s'$ in pistons P and P'. When the gases are not wanted for heating or illuminating purposes, then the valves $x x'$ are securely closed, and the valves $s$ and $s'$ in pistons P and P' are regulated for the escape of the gases, after being compressed to the required degree by the operation of the pistons P P'.

When either piston—as P, for instance—begins its downward movement, the cylinder K is full of gas, admitted to it through valve $o$ from reservoir L. Valve $o$ closes as the piston descends. The gases confined in K are compressed to the required degree, when either valve $x$ or valve $s$, as the case may be, opens for the escape of the uncondensed gases and the vapor of water. The value of this invention consists in so regulating the temperature of the gases in B, D, M, L, K, and K', as well as the pressure brought to bear upon them in these receptacles respectively, as to condense the more valuable pyroligneous products and to allow the vapor of water and the uncondensable gases to escape. Thus the water is largely separated from the acetic acid while these two elements are in a volatile or gaseous state.

As modifications of my construction, I may dispense with the fan E when I use the double-cylinder compressor, which alone would withdraw the gases from the kiln. Further, I may inject air, gas, or steam into M and H, or D, to increase the pressure upon the gases in these receptacles, in which case I use one or more of these receptacles, or employ any other suitable receiver into which air, gas, or steam may be injected for such purpose. I may employ the steam-injector in flue B for withdrawing the gases from the kiln and forcing them into receptacles D, M, and H, instead of the fan, or employ a steam-injector in connection with fan E. I may increase the length of flue B more or less, and regulate its temperature, and employ it as a condenser without either fan or steam injector, or in connection with either or both. I may employ D as a cooler to condense a portion of the gases and vapor of water in connection with M or H as compressors to act upon the gases uncondensed by D. I may build the kiln A, flues $h$, B, C, R and N, and receptacle D, of brick, stone, iron, or any suitable material. Compressors M and H may be of iron, copper, or of any suitable material. The flue $h$ may be built underneath the kiln A, and receive the gases through openings in the bottom of the kiln. The number of receptacles D may be increased to two or more, and fan E located anywhere among them. I may employ one or more fans or steam-injectors. Flue B, and receptacles D, M, and H, may be heated by gases coming from the kiln A, or heat may be applied to increase their temperature, or, on the contrary, I may employ water or other means to diminish their temperature.

By connecting together different receptacles under different temperatures I may reduce the pyroligneous products successively to liquid forms. The methods and appliances for producing the pressure needed to condense these gases are various. I have mentioned several of them in the foregoing by the application of springs, the piston and its equivalents, and the injection of air, steam, or gas.

This apparatus may be employed in reducing to a liquid any other gas that will liquefy under pressure.

While pyroligneous acid, for a long period, has been obtained by the dry distillation of wood in iron retorts, and the condensation by cooling of the gases thrown off in course of the carbonization of wood; and, more recently, the gases thrown off from charcoal-kilns have been condensed by being conveyed through pipes immersed in cold water, and thus economized; yet the valuable wood products found in the gases thrown off in charring wood have never heretofore been obtained by submitting these gases under regulated temperature to pressure.

By the process described the tedious and expensive operation of neutralizing the crude liquor with lime, and then evaporating to dryness is greatly shortened, as by far the greater part of the water passes off in the form of steam when the wood-acid is liquefied by heat and pressure. Indeed, this process will largely do away with the manufacture of the acetate of lime, and the expensive process of treating that salt with muriatic or sulphuric acid. This process of reducing these gases to liquid is applicable to the methods now in use for obtaining such gases by charring wood in iron retorts and condensing them by refrigeration.

I am aware of the construction of flue-discharge and regulating-dampers shown in patent No. 78,264, and therefore do not wish to be understood as claiming such arrangement broadly; but What I desire to secure by Letters Patent is—

1. The combination, with the main body of the kiln, of the surrounding discharge-flue $h$, situated within the furnace-walls and at its base, said flue being provided with stopper-dampers for regulating the ingress of vapors from the kiln, substantially as shown and described.

2. In combination with kiln A, provided with flues $h$, dampers $e$, test-holes, and the cemented floor, a pressure-fan and a receptacle, D, provided with an air, gas, or steam injector, and with pipes, valves, dampers, outlets, and traps for the compression of gases under graduated temperature, substantially as and for the purposes set forth.

3. In combination with a charcoal-kiln having flues, dampers, and test-holes, and connecting with a pressure-fan, and a receptacle provided with an injector, and with valves, dampers, traps, and inlet and outlet connections for the purpose, a receiver or chamber, M, provided with sliding cap G', having valve g', and secured by cords J, said receiver having a trap, n, and valve p, substantially as and for the purposes set forth.

4. In combination with kiln A, having the flues, dampers, and test-holes, and connecting with a gas-receptacle provided with an injector, valves, dampers, inlet and outlet connections, the receiver M provided with sliding cap, sustaining cords and valves, and the double-cylinder compressor H, provided with pistons, walking-beam, gas-reservoir, valves, and traps, substantially as shown, for the purposes set forth.

5. The process of making concentrated pyroligneous acid, which consists in exhausting the hot volatile products from a charcoal-kiln and compressing them until the acid vapors are liquefied, the temperature at the same time being maintained at such height that the diluting water shall be separated and permitted to escape in a vaporized condition, substantially as herein shown and described.

In testimony that I claim the foregoing as my own I have affixed my signature in presence of two witnesses.

HENRY M. PIERCE.

Witnesses:
  H. A. DANIELS,
  THEODORE MUNGEN.